United States Patent [19]

Kamiyama et al.

[11] Patent Number: 4,822,269
[45] Date of Patent: Apr. 18, 1989

[54] VENT TYPE INJECTION MOLDING MACHINES

[75] Inventors: Takashi Kamiyama; Shigeru Fujita, both of Numazu, Japan

[73] Assignee: Toshiba Kikai Kabushiki Kaisha, Tokyo, Japan

[21] Appl. No.: 87,203

[22] Filed: Aug. 20, 1987

[30] Foreign Application Priority Data

Aug. 20, 1986 [JP] Japan .................. 61-194496
Aug. 27, 1986 [JP] Japan .................. 61-200892

[51] Int. Cl.⁴ .................. B29C 45/22; B29C 45/34
[52] U.S. Cl. .................. 425/203; 264/102; 366/75; 366/77; 366/139; 425/567; 425/568; 425/570; 425/812
[58] Field of Search .................. 425/113, 190, 203, 563, 425/567, 568, 569, 570, 812; 264/102, 328.17; 366/75, 77, 78, 139

[56] References Cited

U.S. PATENT DOCUMENTS 3,295,169  1/1967  Moslo .................. 425/563
4,299,791  11/1981 Aoki .................. 425/569

*Primary Examiner*—Jay H. Woo
*Assistant Examiner*—Timothy W. Heitbrink
*Attorney, Agent, or Firm*—Cushman, Darby & Cushman

[57] ABSTRACT

In a vent type injection molding machine of the type comprising a heating cylinder, injection nozzle means having a vent port and connected to the front end of the heating cylinder and a reciprocatable screw for metering a predetermined quantity of resin to be injected, the injection nozzle means comprises a first injection nozzle connected to the heating cylinder, a second injection nozzle coaxial with the first injection nozzle, a spring for urging the second injection nozzle against a stationary metal mold and a housing surrounding the first and second injection nozzles. The vent port is provided through the housing at a point communicating with a space in the housing between the first and second injection nozzles. The operation of the injection molding machine is controlled by a method comprising the steps of metering a predetermined quantity of molten resin to be injected by advancing the screw, closing the vent port and the injection nozzle means, retracting the screw thus forming a space in the injection nozzle means, and discharging the gases of volatile substances and moisture contained in the molten resin.

3 Claims, 2 Drawing Sheets

VENT TYPE INJECTION MOLDING MACHINES

BACKGROUND OF THE INVENTION

This invention relates to a vent type injection molding machine of the type wherein volatile substances and moisture which are contained in a molten resin and air presenting in a metal mold cavity are removed before an injection operation, and a method of operating the vent type injection molding machine.

When the resin contains volatile substances and moisture at the time of injection or when air is present in the mold cavity, gases of these substances would be sealed between the surface of the injected resin and the inner surface of the mould cavity so that such defects as silver streaks and resin burning would be resulted. To prevent such defects, the resin may be predried before it is loaded in the injection machine. However, since this method increases the cost, the vent type injection molding machine has been proposed.

One example of the prior art vent type injection molding machine will now be described with reference to FIG. 3, of the accompanying drawings, which comprises a screw 12 contained in a heating cylinder 11 to be reciprocatable and rotatable. A vent port 13 is formed at an intermediate point of the heating cylinder 11 for discharging volatile components and moisture into surrounding air or for sucking them with a vacuum pump, not shown. Unless the resin pressure at the vent port 13 is made to be sufficiently low, the resin tends to flow out and clog the vent port 13, thus disenabling the injection molding machine. Accordingly, as shown in FIG. 3, the screw 12 was divided into two sections, that is a first stage section 12A and a second stage section 12B. With this construction, it has been necessary to design such that the transfer capability of the second stage section 12B will be sufficiently larger than that of the first stage section 12A.

For this reason, it was necessary to increase the entire length of screw 12 which not only increases the cost but also imposes a limit on the screw design. Due to a screw construction necessary to maintain the vent port at a low pressure, the resin tends to stay at the vent portion, thus causing burning of the resin and making it difficult to readily change the resin.

Moreover, with the prior art vent system, as it is difficult to remove the air in the mold cavity, it has been obliged to use an evacuated metal mold. In this case, an evacuation pipe having a sufficiently large cross-sectional area is connected to the metal mold so that it is necessary to use some measure which prevents leakage of the resin through the evacuation pipe at the time of injecting the resin. Moreover, the metal mold must be carefully designed so as not to impair the appearance of the molded product.

FIG. 4 shows one example of a prior art injection molding apparatus utilizing an evacuated metal mold, in which an injection nozzle 21 of the heating cylinder 11 is urged against a stationary metal mold 22. A movable mold 23 is moved toward and away from the stationary metal mold to define a mold cavity 24 therebetween. A cover plate 25 is secured to metal mold 23 or 22, and an evacuating passage 26 is provided through the movable metal mold 23. In order to evacuate at a high speed, the passage 26 should have a large cross-sectional area and open at the peripheral surface of the movable metal mold 23. After the cavity 24 has been surrounded by cover 25, the cavity 24 is evacuated through passage 26. However, this construction requires a large evacuating apparatus having a capacity of evacuating a volume much larger than the actual volume of the cavity 24. Moreover, as it takes a definite evacuation time before mold closure, the time of the molding cycle becomes long.

SUMMARY OF THE INVENTION

Accordingly, it is an object of this invention to provide a novel vent type injection molding machine and a method of controlling the same wherein a vet port is provided for the injection nozzle so as to discharge gases of volatile substances and moisture contained in a molten resin as well as air entrapped in a mold cavity so as to improve the quality and appearance of molded products.

According to one aspect of this invention, there is provided a method of controlling an injection molding machine including a heating cylinder, an injection nozzle having an openable and closeable vent port and connected to a front end of the heating cylinder, and a rotatable and reciprocatable screw acting as resin metering means and contained in the heating cylinder, the method comprising the steps of metering a predetermined quantity of molten resin to be injected by advancing the screw, closing the vent port, retracting the screw thus forming a space in the injection nozzle, and discharging gases of volatile substances and moisture contained in the molten resin to the outside of the injection molding machine through the vent port.

Discharge of the gases and moisture is effected by merely opening the vent port to the surrounding atmosphere or with an evacuation pump. The screw is retracted over a stroke longer than a stroke necessary for metering a predetermined quantity of the resin to be injected. Furthermore closures of the vent port and the injection nozzle, and retraction of the screw in a not rotated state are performed according to predetermined timings.

According to another aspect of this invention there is provided a vent type injection molding machine of the type comprising a heating cylinder, injection nozzle means having an openable and closeable vent port connected to a front end of the heating cylinder, and a rotatable and reciprocatable screw acting as resin metering means and contained in the heating cylinder, characterized in that the injection nozzle means comprises a first injection nozzle connected to the front end of the heating cylinder, a second injection nozzle coaxial with the first injection nozzle, spring means interposed between the first and second injection nozzles for urging the second injection nozzle against a stationary metal mold, and a housing surrounding the first and second injection nozzles and connected to the heating cylinder or the first injection nozzle, and that the vent port is provided through the housing at a point communicated with a space in the housing between the first and second injection nozzles.

The vent port is closed during an injection stroke and opened to the surrounding atmosphere or connected to evacuation means after retracting the screw for evacuating space inside of the housing and a mold cavity.

DESCRIPTION OF THE PREFERRED EMBODIMENT

Figure 1:
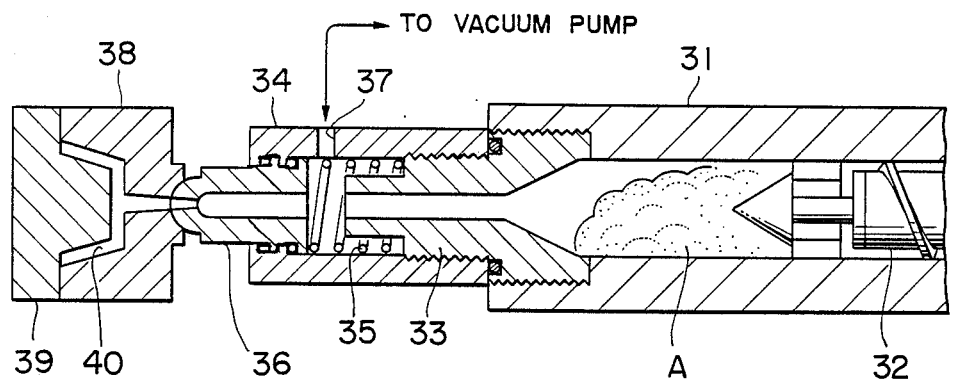
FIG. 1 is a longitudinal sectional view showing one embodiment of the vent type injection molding machine according to this invention.
Figure 3:
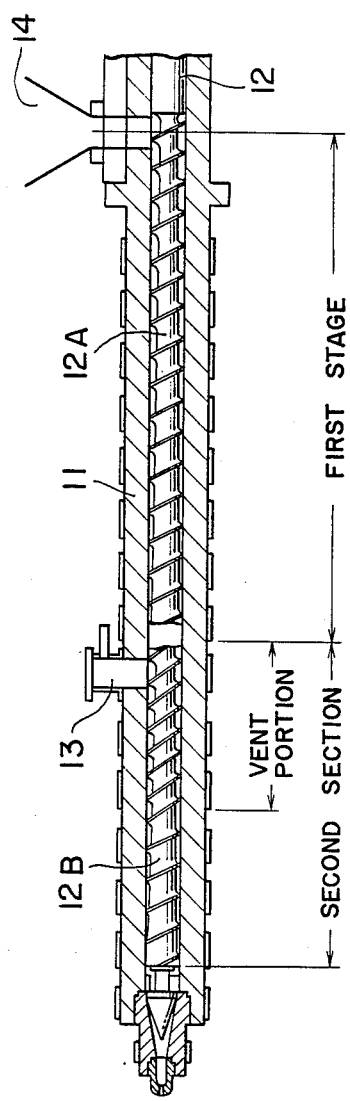
FIGS. 3 and 4 are longitudinal sectional views showing prior art injection molding machines of different types.
Figure 4:
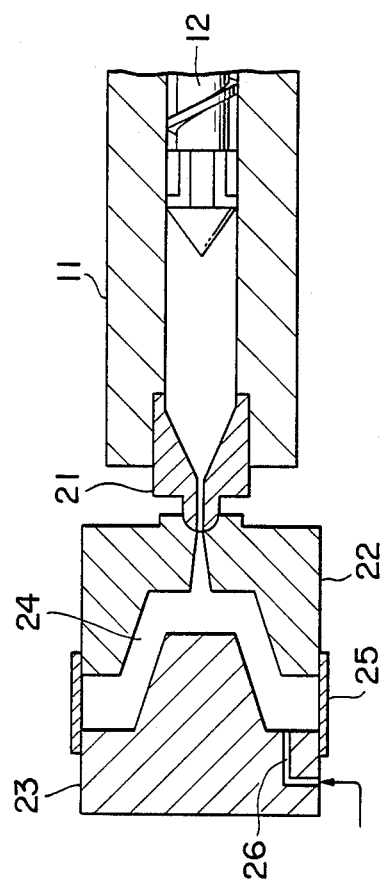

The vent type injection molding machine shown in FIG. 1 comprises a heating cylinder 31 whose temperature is controlled to any desired value by an electric heater, not shown, and a screw 32 contained in the heating cylinder 31 to be rotatable and reciprocatable. A hopper 14 (see FIG. 3) is connected to the righthand end of the heating cylinder 31. Different from the prior art injection machine shown in FIG. 3, vent port 13 is not provided for the heating cylinder 31 shown in FIG. 1. A first nozzle 33 is threaded to the outer or lefthand end of the heating cylinder 31, and a housing 34 is provided to surround the nozzle 33. The housing 34 may be threaded to the outside of the nozzle 33, or may be suitably connected to the lefthand end of the heating cylinder 31. A second nozzle 36 is coaxially contained in housing 34 and normally urged forewardly by a spring 35. A vent port 37 is formed through housing 34 near the front end of the first nozzle 33 such that the vent port 37 would communicate with a space between the first and second nozzles 33 and 36, which is formed when the latter is advanced by spring 35 as shown in FIG. 1. Under this state, the vent port 37 is communicated with mold cavity 40 and the interior of the heating cylinder 31. The mold cavity 40 is defined between a stationary metal mold 38 and movable metal mold 39 when they are clamped together.

The embodiment shown in FIG. 1 operates as follows. Upon completion of the injection step, the rotation of the screw 32 is stopped, the second nozzle 36 is in contact with the stationary metal mold 38, and both nozzles 33 and 36 are directly in contact with each other. Under this state, the screw 32 is rotated and advanced for starting a metering step, while at the same time both metal molds 38, 39 and a molded product are cooled. When the metering operation is completed, the rotation of the screw 32 is stopped and the screw 32 is retracted over a distance larger than an ordinary suck back distance to create a partial vacuum in the heating cylinder 31. At this time, a molten resin A is stored in the heating cylinder 31 near the front end of screw 32 leaving a not filled space at the front end of the heating cylinder 31. Accordingly, volatile substances and moisture contained in the molten resin A volatilize from the molten resin. Under this condition, the heating cylinder 31 is retracted, the second nozzle 36 is separated away from the stationary metal mold 38, and both nozzles 33 and 36 are also separated.

At this time, the cooling has been completed, so that the movable metal mold 39 is moved to the left to take out the molded product. Thereafter the movable metal mold 39 is moved to the right so as to form the mold cavity 40. After that, the heating cylinder 31 is advanced as shown in FIG. 1 to commence the next cycle. The vent port 37 is normally opened to the surrounding atmosphere or connected to an evacuating device, not shown, which is operated under the state shown in FIG. 1 for evacuating the interior of the heating cylinder 31 and mold cavity 40. Then, the heating cylinder 31 is advanced to directly contact the first nozzle 33 against the second nozzle 36 for closing the vent port 37. When an evacuating device is used, it is stopped and the injection step is started. The cycle described above is repeated for obtaining products of a desired number.

Where an ordinary resin is used, as above described, immediately after completion of the metering, the screw 32 is retracted without being rotated. But depending upon the type of the resin it is advantageous to retract the screw after a predetermined time.

According to still another method of controlling, immediately before retracting the screw over a stroke larger than a stroke necessary for metering the resin, the heating cylinder 31 is retracted over a distance such that the second injection nozzle 36 is still urged against the stationary metal mold 38, but that the first and second injection nozzles 33 and 36 are separated from each other The screw 32 and the heating cylinder 31 may be retracted simultaneously.

After the screw has reached its limit of retraction without being rotated, the heating cylinder 31 is retracted further so as to separate the second injection nozzle 36 away from the stationary metal mold 38. At this time the vent port 37 is opened to the atmosphere so that air flows into the lefthand portion of the heating cylinder 31 from outside through the vent port 37 and the axial opening of the first injection nozzle 33. As a consequence, the molten resin A is pushed to the right as shown in FIG. 1, so that it is possible to prevent the molten resin from remaining in the central opening of the first injection nozzle 33 thereby ensuring an air passage between the molten resin A and the vent port 37.

Until this time, both metal molds 38, 39 and the injected resin have been cooled sufficiently so that the movable metal mold 39 is retracted (moved to the left) for taking out a molded article and then the movable metal mold 39 is advanced. After clamping together both metal molds 38 and 39 to define the mold cavity 40 the heating cylinder 31 is advanced for urging the second nozzle 36 against the stationary metal mold 38. At this time an evacuating device, not shown, is connected to the vent port 37 so as to exhaust gases generated by the volatile substances and moisture contained in the molten resin as well as the air entrapped in the mold cavity. Exhausting of the gases and air can also be achieved by merely opening the vent port to the atmosphere without connecting the vent port to an evacuating device.

After completing the evacuation, the heating cylinder 31 is advanced again to start a new injection molding cycle. In the foregoing description, the evacuation was made after the second nozzle 36 has been urged against the stationary metal mold 38, but the evacuation can also be made in a period between retraction of the screw subsequent to the metering so as to disengage the second injection nozzle 36 from the stationary metal mold 38, and again urge the second injection nozzle to the stationary metal mold. In this case, the evacuation can be controlled by a timer, not shown, or by suitable timing signals. Various operations of the elements can be effected in a predetermined order by using predetermined timing signals.

Figure 2:
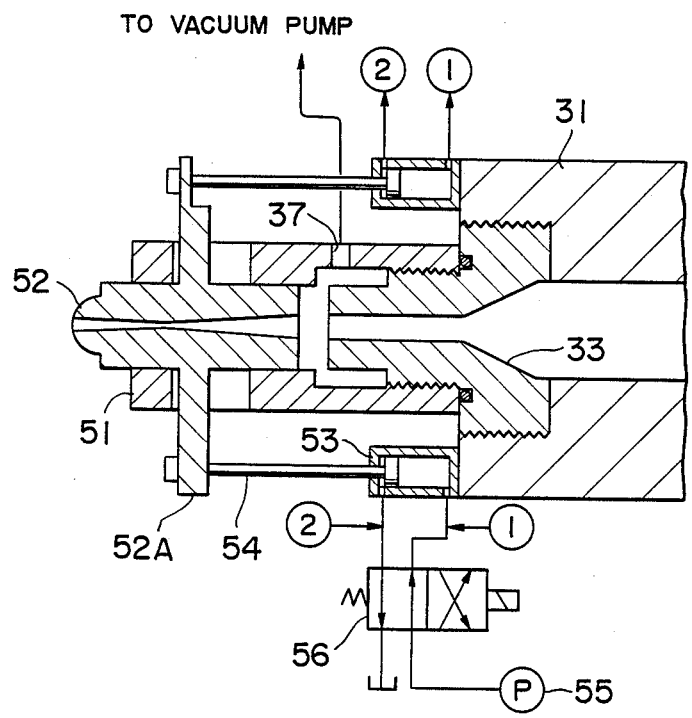
FIG. 2 is a longitudinal sectional view of a portion of a modified embodiment of this invention.

In a modified embodiment shown in FIG. 2, only the construction and separation of the second nozzle are different from the embodiment shown in FIG. 1. The first nozzle 33 is secured to the front end of heating cylinder 31 and a housing 51 surrounding the first nozzle 33 may be secured thereto by screw threads or other means. The second nozzle 52 is slidably contained in the reduced diameter portion of housing 51. Just like the first embodiment, the second nozzle 52 is urged against a stationary metal mold (not shown in FIG. 2) as the heating cylinder 31 is advanced. A vertical flange 52A is connected to piston rods 54 of a pair of cylinders 53 secured to the front end of the heating cylinder 31 so that the second nozzle 52 can be moved to an advanced position shown in FIG. 2 and a retracted position by operating a transfer valve 56 which admits pressurized oil from a source of pressurized oil 55 and discharges the pressurized oil from the cylinders 53. A vent port 37 is provided through the large diameter portion of the housing 51, which is used in the same manner as the vent port 37 shown in FIG. 1.

The embodiment shown in FIG. 2 operates in the same manner as in FIG. 1 except that the transfer valve 56 is switched such that it admits the pressurized oil to the righthand chambers of cylinders 53 for advancing the second nozzle 52 whereas admits the pressurized oil to the lefthand chambers of cylinders 53 for retracting the second nozzle.

As above described, according to this invention, since a vent port is provided for a housing enclosing first and second nozzles, it becomes possible to inject a highly moisture absorptive resin with a standard injection molding machine not having a vent port without pre-drying the resin. Moreover, at the time of removing the volatile substances and moisture contained in the resin, the air in the mold cavity can also be removed, so that evacuated metal mold injection becomes possible with a conventional metal mold. Furthermore, it is possible to reduce the length of the screw. Since the mold cavity is evacuated, burning of the injected molten metal caused by adiabatic compression can be prevented.

What is claimed is:

1. In a vent type injection molding machine of the type comprising a heating cylinder, injection nozzle means having a vent port and connected to a front end of said heating cylinder, and a rotatable and reciprocatable screw acting as resin metering means and contained in said heating cylinder, the improvement wherein:

said injection nozzle means comprises a first injection nozzle connected to the front end of said heating cylinder, a second injection nozzle coaxial with said first injection nozzle, spring means interposed between said first and second injection nozzles for urging the second injection nozzle against a stationary metal mold and a housing surrounding said first and second injection nozzles and connected to said heating cylinder or said first injection nozzle;

said vent port being provided through said housing at a point communicated with a space in said housing axially between said first and second injection nozzles; and further comprising means for closing said vent port during an injection stroke of said machine.

2. In a vent type injection molding machine of the type comprising a heating cylinder, injection nozzle means having a vent port and connected to a front end of said heating cylinder, and a rotatble and reciprocatable screw acting as resin metering means and contained in said heating cylinder, the improvement wherein:

said injection nozzle means comprises a first injection nozzle connected to the front end of said heating cylinder, a second injection nozzle coaxial with said first injection nozzle, spring means interposed between said first and second injection nozzles for urging the second injection nozzle against a stationary metal mold and a housing surrounding said first and second injection nozzles and connected to said heating cylinder or said first injection nozzle;

said vent port being provided through said housing at a point communicated with a space in said housing between said first and second injection nozzles; and further comprising an evacuating means for evacuating a space inside of said housing and a mold cavity through said vent port.

3. In a vent type injection molding machine of the type comprising a heating cylinder, injection nozzle means having a vent port and connected to a front end of said heating cylinder, and a rotatable and reciprocatable screw acting as resin metering means and contained in said heating cylinder, the improvement wherein:

said injection nozzle means comprises a first injection nozzle connected to the front end of said heating cylinder, a second injection nozzle coaxial with said first injection nozzle, spring means interposed between said first and second injection nozzles for urging the second injection nozzle against a stationary metal mold and a housing surrounding said first and second injection nozzles and connected to said heating cylinder or said first injection nozzle;

said vent port being provided through said housing at a point communicated with a space in said housing between said first and second injection nozzles; and further comprising a fluid pressure actuator for moving said second injection nozzle, and a transfer valve for controlling supply and discharge of pressurized fluid to and from said fluid pressure actuator.

* * * * *